G. H. LEE.
CHICKEN FEED TROUGH.
APPLICATION FILED JAN. 24, 1912.
1,043,609.
Patented Nov. 5, 1912.
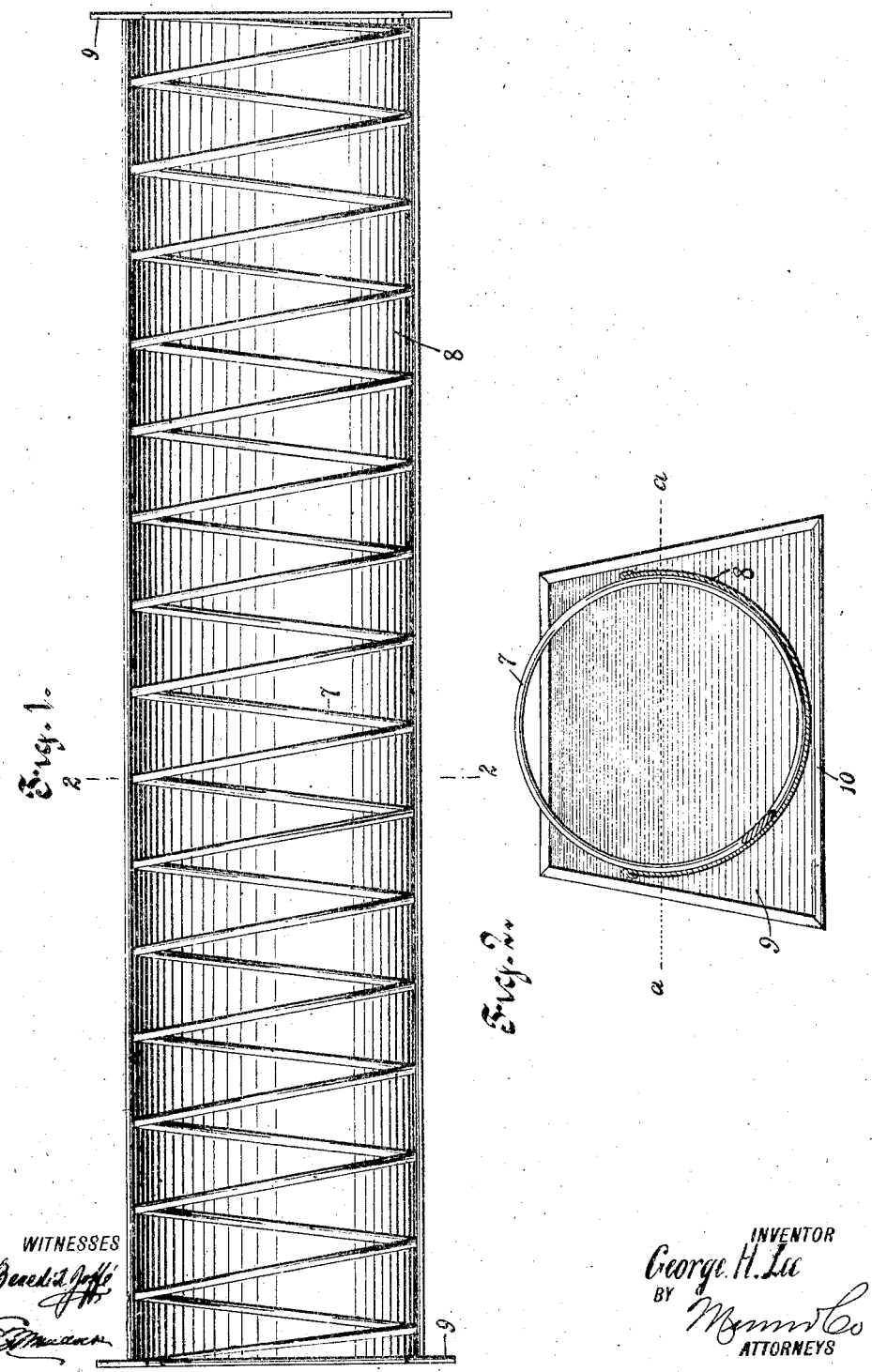
WITNESSES
INVENTOR
George H. Lee
BY
ATTORNEYS

UNITED STATES PATENT OFFICE.

GEORGE H. LEE, OF OMAHA, NEBRASKA.

CHICKEN FEED-TROUGH.

1,043,609.

Specification of Letters Patent.

Patented Nov. 5, 1912.

Application filed January 24, 1912. Serial No. 673,016.

*To all whom it may concern:*

Be it known that I, GEORGE H. LEE, a citizen of the United States, and a resident of Omaha, in the county of Douglas and State of Nebraska, have invented a new and Improved Chicken Feed-Trough, of which the following is a full, clear, and exact description.

Among the principal objects which the present invention has in view are:—to provide a feed trough for fowl and means for preventing the fowl from scratching or otherwise wasting the grain or other feed contained in the trough; to provide a guard for the trough which may be readily and quickly adjusted therein after the feed has been deposited to in this manner avoid interference with the charging or loading of the trough; to provide a guard of the character set forth which is simple, economical and efficient in operation; to provide a trough and guard of the nature and character mentioned which coöperate to hold the guard in position; and to provide a construction for a trough of the character mentioned which facilitates the cleaning and sanitation of the same.

One embodiment of the present invention is disclosed in the structure illustrated in the accompanying drawings, in which like characters of reference denote corresponding parts in both views, and in which—

Figure 1 is a plan view of a trough constructed and arranged in accordance with the present invention; and Fig. 2 is a vertical cross section of the same taken on the line 2—2 in Fig. 1.

Heretofore feed troughs have been provided for chickens and other fowl wherein a trough has been covered with bars more or less resilient in character to prevent the fastening of the head of the fowl between the bars of the said trough. Such bars, however, have entered intimately into the construction of the trough, being formed integrally therewith or structurally and permanently connected therewith. The objection which has arisen to such constructions has been that the bars have interfered materially with the necessary cleaning of the trough. In consequence of this lack of adaptability of the structure to cleaning, the same has been neglected, oftentimes resulting in the production and spread of disease among the chickens using the trough. It is to avoid this objection that I use as a guard a wide coiled spiral spring 7. The convolutions of the spring 7 are spaced apart the necessary distance to permit the extension therebetween of the head of the chicken or fowl. The spring 7 is not fastened within the trough 8 but is held therein by the upper edges of the said trough each overhanging the central diameter of the said spring. The resiliency of the spring permits the same to be lifted out of engagement with the sides of the trough.

The trough 8, as shown best in Fig. 2 of the drawings, is circular in form, and is shaped to form more than a half of a completed circle, leaving an opening at the top of less than half of the completed circle, the upper edges of the said opening or edge of the trough being therefore slightly contracted beyond the diameter which is in line with the dotted line *a—a* shown in Fig. 2, of the drawings. The slight overhang of the edges of the trough 8 where the same extend above the said dotted line serves to prevent the too-free withdrawal of the spring 7. The projection of the coils of the spring 7 serves as a guard to prevent the insertion of the feet of the chickens in the trough and the consequent scattering of the grain contained therein. The trough 8 is rigidly secured to the ends 9, 9, the bottom edge 10 of which forms a support for the trough. The trough and ends 9 are constructed of any suitable material, that preferred being galvanized iron as lending itself more readily to the cleansing above referred to.

When employing a trough constructed and arranged in accordance with the present invention it will be understood that when the grain or other food is placed in the trough it may be preferred to remove the spring 7. This is readily accomplished by lifting the spring from the engagement of the trough 8. To do this sufficient strength is exerted to overcome the grip of the overhang of the sides of the trough 8 upon the coils of the spring. The spring being removed and set to one side out of the way, the trough is charged with the desired food, when the spring is again introduced therein, being forced into gripping relation with the sides of the trough.

When it is desired to clean the trough and guard spring 7 the two are separated to facilitate the operation of cleaning. In this position they may be treated in any manner desired.

Having thus described my invention, what I claim as new and desire to secure by Letters Patent is:—

1. In a device of the character described, a trough having inwardly overhanging sides; and a spiral spring adapted for insertion in said trough to engage the same below the overhang thereof, a portion of the convolutions of said spring extending above the edge of said trough.

2. In a device of the character described, a trough shaped to form more than a half circle; and a spiral spring adapted for mounting therein having a normal diameter of not less than the said trough.

3. In a device of the character described, a trough; and a spiral spring mounted in said trough and removable therefrom, said spring having a diameter not less than the width of said trough.

4. In a device of the character described, a trough shaped to form more than a half circle; and a spring having wide-spread convolutions and a diameter not less than the diameter of said trough.

In testimony whereof I have signed my name to this specification in the presence of two subscribing witnesses.

GEORGE H. LEE.

Witnesses:
HELEN M. DAILEY,
R. O'NEIL.